(12) United States Patent
Zhuang et al.

(10) Patent No.: US 10,680,820 B2
(45) Date of Patent: Jun. 9, 2020

(54) METHOD OF CREATING AND RECOVERING DIGITAL WALLET

(71) Applicant: CoolBitX Ltd., Grand Cayman (KY)

(72) Inventors: Jay Zhuang, Taipei (TW); Shih-Mai Ou, Taipei (TW)

(73) Assignee: COOLBITX LTD., Grand Cayman (KY)

( * ) Notice: Subject to any disclaimer, the term of this patent is extended or adjusted under 35 U.S.C. 154(b) by 329 days.

(21) Appl. No.: 15/916,608

(22) Filed: Mar. 9, 2018

(65) Prior Publication Data

US 2019/0280866 A1 Sep. 12, 2019

(51) Int. Cl.
| | |
|---|---|
| H04L 29/06 | (2006.01) |
| H04L 9/32 | (2006.01) |
| H04L 9/08 | (2006.01) |
| G06Q 20/36 | (2012.01) |
| G06Q 20/32 | (2012.01) |

(52) U.S. Cl.
CPC .............. *H04L 9/32* (2013.01); *G06Q 20/32* (2013.01); *G06Q 20/36* (2013.01); *H04L 9/0819* (2013.01); *H04L 9/0869* (2013.01)

(58) Field of Classification Search
None
See application file for complete search history.

(56) References Cited

U.S. PATENT DOCUMENTS

| | | | | | |
|---|---|---|---|---|---|
| 6,170,058 | B1 * | 1/2001 | Kausik | ............. | G06F 21/6245 |
| | | | | | 713/193 |
| 10,147,076 | B2 * | 12/2018 | Zhou | ............. | G09C 5/00 |
| 2010/0250497 | A1 * | 9/2010 | Redlich | ............. | F41H 13/00 |
| | | | | | 707/661 |
| 2018/0189753 | A1 * | 7/2018 | Konda | ............. | G06Q 20/065 |
| 2019/0034917 | A1 * | 1/2019 | Nolan | ............. | G06Q 20/3278 |
| 2019/0034919 | A1 * | 1/2019 | Nolan | ............. | G06Q 20/3674 |

(Continued)

OTHER PUBLICATIONS

Liu, Yi et al. An efficient method to enhance Bitcoin wallet security. 2017 11th IEEE International Conference on Anti-counterfeiting, Security, and Identification (ASID). https://ieeexplore.ieee.org/stamp/stamp.jsp?tp=&arnumber=8285737 (Year: 2017).*

(Continued)

*Primary Examiner* — Jeremiah L Avery
(74) *Attorney, Agent, or Firm* — Rabin & Berdo, P.C.

(57) ABSTRACT

A method of creating and recovering digital wallet is implemented using a storage device and a connected device that are connected to each other. The storage device has a private key stored thereon for confirming a digital asset transaction, and includes an information conveying unit, an operation interface, a processor and a security element. The method includes following steps: a user uses the connected device to generate and transmit a digital wallet creating request to the security element via the processor; the security element verifies there is not any digital wallet stored thereon and accordingly creates a digital wallet; the processor requests a recovery mnemonic from the security element and provides the same via the information conveying unit for the user to back it up; and the connected device obtains and decodes an encoded asset message stored in the digital wallet to create a piece of public digital wallet information.

10 Claims, 6 Drawing Sheets

(56) References Cited

U.S. PATENT DOCUMENTS

2019/0121988 A1* 4/2019 van de Ruit .......... G06F 21/602

OTHER PUBLICATIONS

Zhu, Fangdong et al. Trust your wallet: A new online wallet architecture for Bitcoin. 2017 International Conference on Progress in Informatics and Computing (PIC). https://ieeexplore.ieee.org/stamp/stamp.jsp?tp=&arnumber=8359562 (Year: 2017).*

Hu, Jhe-Yi et al. Android-based mobile payment service protected by 3-factor authentication and virtual private ad hoc networking. 2012 Computing, Communications and Applications Conference. https://ieeexplore.ieee.org/stamp/stamp.jsp?tp=&arnumber=6154013 (Year: 2012).*

* cited by examiner

METHOD OF CREATING AND RECOVERING DIGITAL WALLET

FIELD OF THE INVENTION

The present invention relates to a method of creating and recovering digital wallet, according to which it is not necessary to use a connected device during a verification process but a user has to manually record a mnemonic before other subsequent verification and transmission processes can be started.

BACKGROUND OF THE INVENTION

The Internet was developed by the United States in the late 1960s for the purpose of protecting national security in the US-USSR competitions in different fields.

Today, everyone can use a connected device to access the Internet and use the Internet as a tool for advertising and marketing, transacting virtual or physical products, operating financial resources and news media, developing education and training, as well as maintaining good human relation.

Meanwhile, more and more Internet users have sensed the importance of protecting personal contact network, privacy and private asset data. The privacy protection that can be provided to users when they use personal electronic products has also received wide attention from users and product developers. To protect personal power/rights or to protect the power/rights of members of different groups or organizations, private accounts, personal passwords and private electronic products are now widely adopted by people.

In response to the users' requirements for protecting their activities on the Internet, digital systems or hardware apparatuses that can protect consumer's or registered member's personal data have been constantly researched, developed, purchased and used by the governments, mass media and online stores.

Therefore, it has become an important issue as how to digitally verify whether the person who is currently operating online is the real owner or holder of the electronic devices used in the online operation, in order to protect consumers' and registered members' personal data.

SUMMARY OF THE INVENTION

A primary object of the present invention is to provide a digital wallet creating and recovering method, according to which a private key is stored on a storage device by a user for use to confirm a digital asset transaction, and the private key is transmitted to a connected device, i.e. a device connectible to the Internet. Therefore, when the connected device has been connected to the Internet, the user can further connect the storage device to the connected device and operate on the connected device, so as to use the private key stored on the connected device to perform a personal digital asset transaction online.

Another object of the present invention is to provide a digital wallet creating and recovering method, according to which a user has to back up a recovery mnemonic shown on a storage device before the storage device transmits a private key of the user to a connected device, and the recovery mnemonic is used later to verify the current storage device holder and the connected device holder are the same one. Meanwhile, the aforesaid verification is not performed on the connected device, lest the current storage device holder and the connected device holder should be two different persons.

A further object of the present invention is to provide a digital wallet creating and recovering method, according to which, when one or both of a storage device and a paired connected device were lost, stolen or damaged, and when a pairing and a connection between the original connected device and a new storage device, or a new connected device and the original storage device, or a new connected device and a new storage device has been set up again, a user of the original storage device and connected device can use a recovery mnemonic held by him/her to recover a digital wallet on the new connected device and/or the new storage device.

To achieve the above and other objects, a first preferred embodiment of the method according to the present invention is implemented via a closed storage device and a connected device that are connected to each other. The storage device has a private key stored thereon for use to confirm a transaction of a digital asset and includes an information conveying unit, an operation interface, a processor and a security element. The first preferred embodiment of the method of the present invention includes the following steps for creating a digital wallet: a user uses the connected device to generate and transmit a digital wallet creating request to the security element via the processor of the storage device; the security element, on receipt of the creating request, checks whether there is already a digital wallet existed thereon; and the security element creates a digital wallet when it verifies there is not any digital wallet existed thereon; the processor requests the security element to generate and transmit a recovery mnemonic to it and then shows the generated recovery mnemonic to the user via the information conveying unit, so that the user can record and back up the recovery mnemonic; and the connected device receives from the security element an encoded asset message that is stored on the digital wallet and then decodes the encoded asset message to create a piece of public digital wallet information.

According to the first preferred embodiment of the method of the present invention, the information conveying unit shows the recovery mnemonic on a surface of the storage device and the user receives, records and backs up the recovery mnemonic by sensory perception, including touching, listening to or viewing the storage device.

According to the first preferred embodiment of the method of the present invention, the user inputs on the operation interface an instruction indicating the recovery mnemonic has been recorded, and then the storage device verifies the backup of the recovery mnemonic has completed by the user.

To achieve the above and other objects, the first preferred embodiment of the method of the present invention further includes the following steps for recovering a digital wallet when the original storage device was lost, stolen or damaged: the connected device obtains the recovery mnemonic according to a digital wallet recovering request, and generates a recovery seed key according to the recovery mnemonic; the connected device encodes the recovery seed key to form an encoded seed key and transmits the encoded seed key to a substitute security element on a substitute storage device, and then the substitute security element decodes the encoded seed key to recover the encoded seed key to the recovery seed key; and the substitute security element transmits information of the digital wallet to the connected device, so that the connected device has an updated public digital wallet information created thereon.

The digital wallet recovering request is generated when the user operates on the connected device; and the connected device, on receipt of the digital wallet recovering request, prompts the user to input the recovery mnemonic on the connected device.

After generating the recovery seed key, the connected device further generates a private key according to the recovery seed key. The private key is transmitted along with the encoded seed key to the substitute security element, at where the encoded seed key and the private key are verified to be correct, and then the encoded seed key is decoded and recovered to the recovery seed key.

A second preferred embodiment of the digital wallet creating and recovering method according to the present invention is implemented via a closed storage device and a first connected device that are connected to each other. The storage device has a private key stored thereon for use to confirm a transaction of a digital asset and includes an information conveying unit, an operation interface, a processor and a security element.

The second preferred embodiment of the method of the present invention includes the following steps for creating a digital wallet: a user uses the first connected device to generate and transmit a digital wallet creating request to the security element via the processor of the storage device; the security element, on receipt of the creating request, checks whether there is already a digital wallet existed thereon; and the security element creates a digital wallet when it verifies there is not any digital wallet existed thereon; the processor requests the security element to generate and transmit a recovery mnemonic to it and then shows the generated recovery mnemonic to the user via the information conveying unit, so that the user can record and back up the recovery mnemonic; and the first connected device receives from the security element an encoded asset message that is stored on the digital wallet and then decodes the encoded asset message to create a piece of public digital wallet information.

The second preferred embodiment of the method of the present invention includes the following steps for recovering a digital wallet when the first connected device and/or the storage device was lost, stolen or damaged: a second connected device obtains the recovery mnemonic according to a digital wallet recovering request, and generates a recovery seed key according to the recovery mnemonic; the second connected device encodes the recovery seed key to form an encoded seed key and transmits the encoded seed key to the security element of the storage device or a substitute security element on a substitute storage device; and then the security element or the substitute security element decodes the encoded seed key to recover the encoded seed key to the recovery seed key.

Finally, the security element or the substitute security element creates the digital wallet according to the recovery seed key and transmits data of the digital wallet to the second connected device, so that the second connected device has a public digital wallet information created thereon.

The present invention is characterized in that a user holding a storage device having a private key stored thereon can use a processor and a security element of the storage device to sequentially perform a series of display and input steps via a connected device and an information conveying unit and an operation interface of the storage device to create or recover a digital wallet on the connected device.

According to the method of the present invention, the security element transmits a recovery mnemonic to the information conveying unit, from where the real private key owner who holds the storage device can learn and record the recovery mnemonic. Only when the user has input the recovery mnemonic to the connected device and the security element verifies the recovery mnemonic transmitted thereto by the connected device is correct, will the security element transmit the formation of the digital wallet to the connected device to complete the creation or the recovery of the digital wallet on the connected device. Meanwhile, to avoid the possibility that a stolen or a lost connected device is operated by a person who is not the real owner of the digital wallet, the method of the present invention also includes the step of verifying whether the private key generated by the connected device that requests for creating or recovering a digital wallet is the same as that provided by the owner of the storage device.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
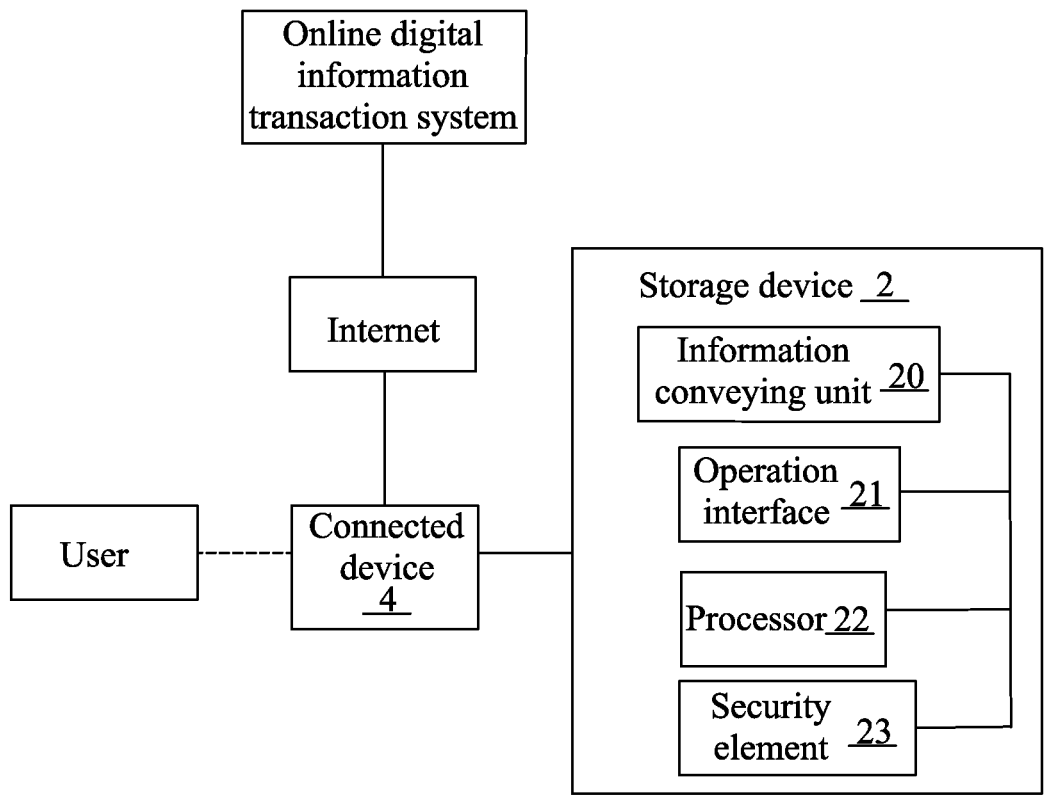
FIG. 1 shows how a connected device, a storage device and other related parts are electrically connected to one another for information transmission among them.

The present invention will now be described with some preferred embodiments thereof and by referring to the accompanying drawings. For the purpose of easy to understand, elements that are the same in the preferred embodiments are denoted by the same reference numerals.

Figure 2:
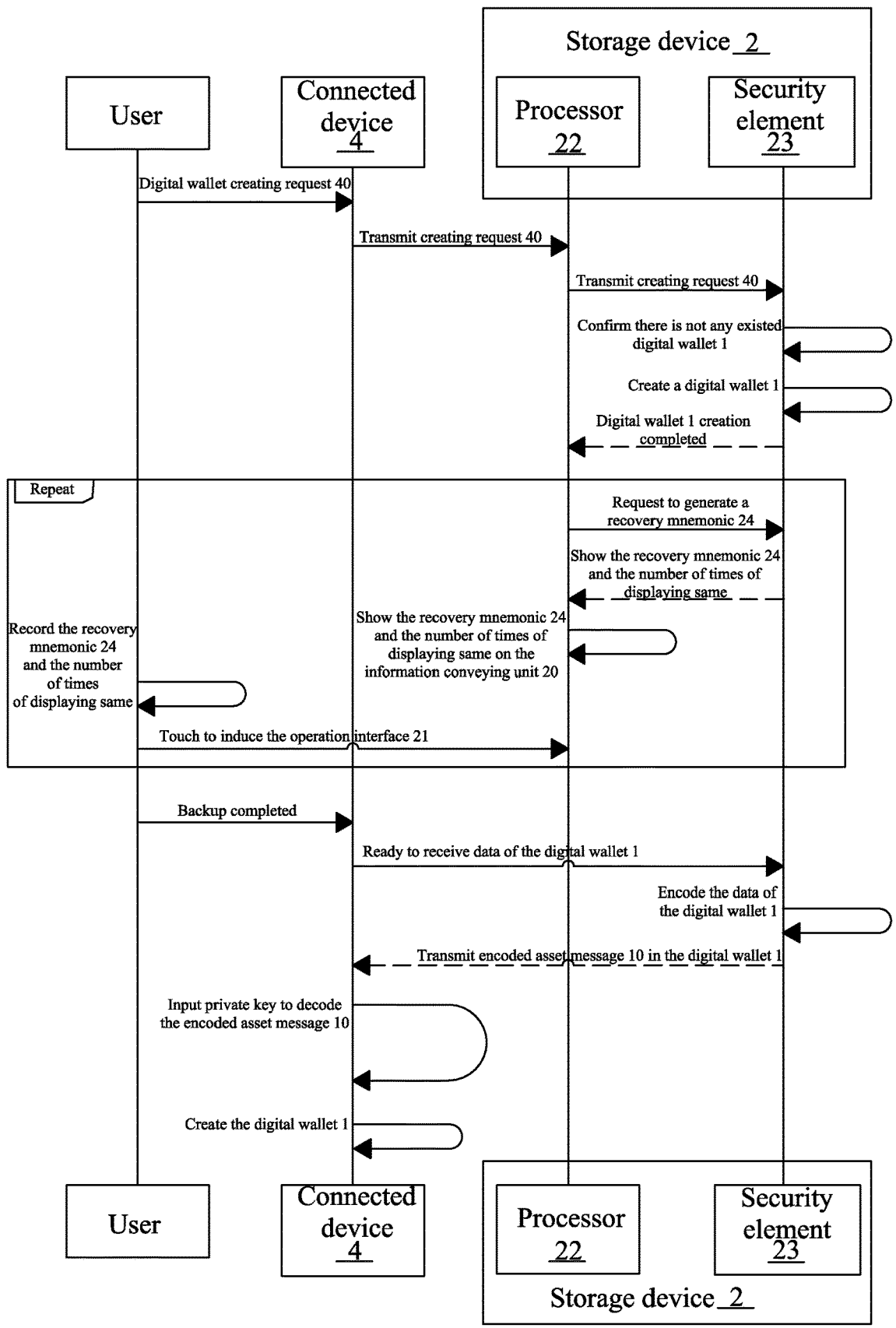
FIG. 2 is a flowchart showing the steps included in a first preferred embodiment of a method according to the present invention for creating a digital wallet.
Figure 3:
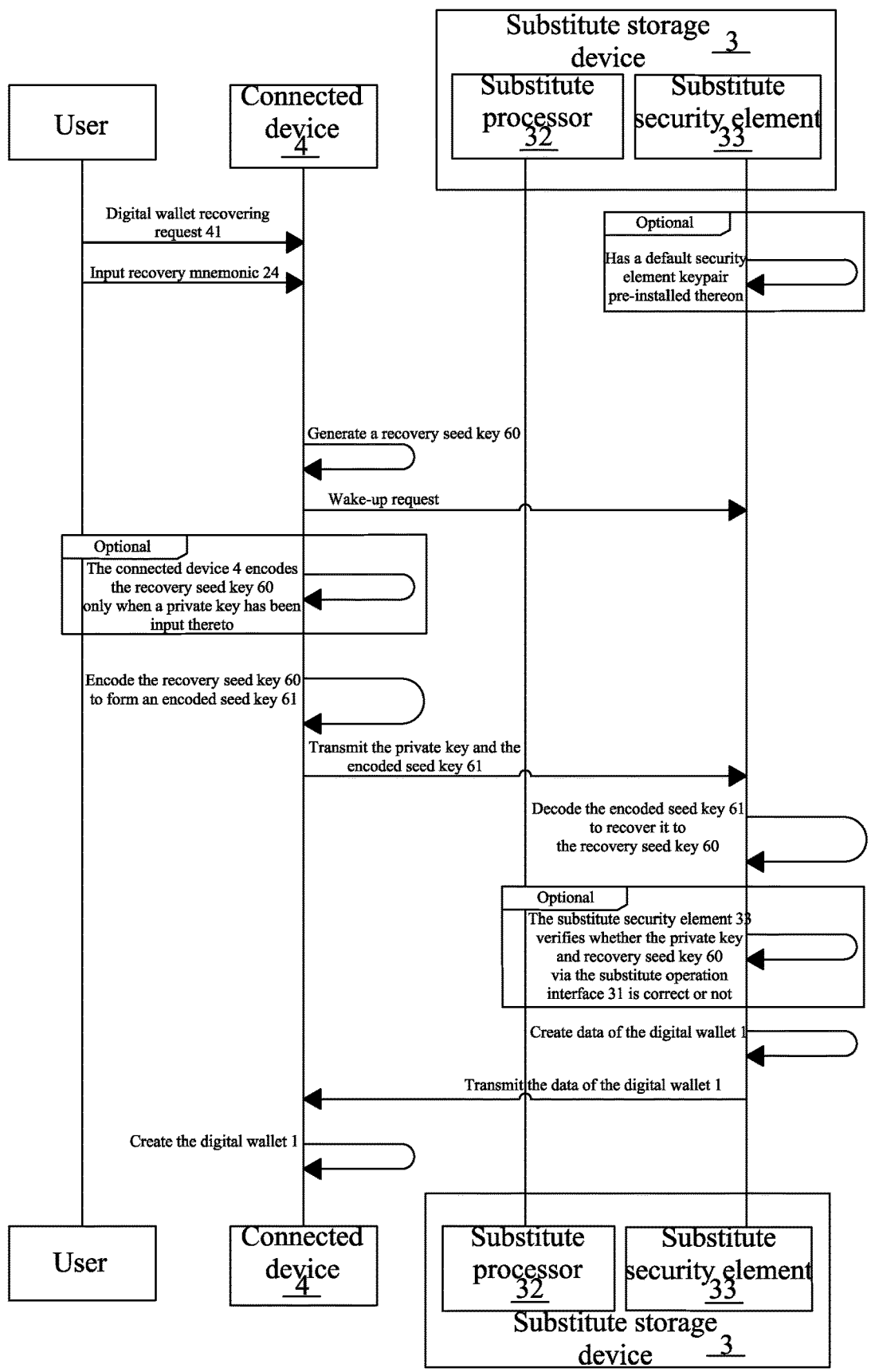
FIG. 3 is a flowchart showing the steps included in the first preferred embodiment of a method according to the present invention for recovering a digital wallet.

Please refer to FIGS. 1 to 3. A user owns a storage device 2 and a connected device 4, which is connectable to the Internet. The storage device 2 has a digital wallet 1 stored thereon. The digital wallet 1 is configured as a private key for transacting a digital asset on the Internet or via an online digital asset transaction system. The digital asset includes account information and amount information indicating an available amount of the digital asset. The storage device 2 externally includes an information conveying unit 20 and an operation interface 21, and internally includes a processor 22 and a security element (SE) 23. The information conveying unit 20, the operation interface 21, the processor 22 and the security element 23 are electrically connected to one another. According to a preferred operable embodiment of the present invention, the storage device 2 can be a Universal Serial Bus (USB), a memory card or a chip card.

The storage device 2 is electrically connectable to the connected device 4. When the storage device 2 has been successfully paired with and connected to the connected device 4, it can be further connected to the Internet via the connected device 4 for transacting the digital asset information in the digital wallet 1 stored on the storage device 2.

On the other hand, when the storage device 2 is not electrically connected to the connected device 4, it is an independent closed mechanism. In other words, a person holding the storage device 2 alone could not freely obtain the information in the digital wallet 1 stored on the storage device 2 from outside of the storage device 2. According to a preferred operable embodiment of the present invention, the connected device 4 can be a computer device, a tablet computer, a mobile phone and the like.

More specifically, a user must have both the storage device 2 and the connected device 4 at hand and get the connected device 4 connected to the Internet in order to use the connected device 4 to read and use the information of the private key (i.e. the digital wallet) stored on the storage device 2. In the event the user holds only one of the storage device 2 and the connected device 4, the user would be not able to make any transaction of personal digital asset on the Internet.

FIG. 2 is a flowchart showing the steps included in a first preferred embodiment of a digital wallet creating and recovering method according to the present invention for creating the aforesaid digital wallet 1. The following describes these steps with reference to FIG. 2.

To create the digital wallet 1, the user firstly inputs a private key on the connected device 4 owned by the user to generate a digital wallet creating request 40. In a preferred operable embodiment, the private key can be a personal password, a personal electronic signature or the like. Then, the creating request 40 is transmitted from the connected device 4 to the processor 22 on the storage device 2, which is also owned by the user. In a preferred operable embodiment, the processor 22 can be a memory control unit (MCU) or a microprocessor control unit (MCU). On receipt of the creating request 40, the processor 22 transmits the same to the security element (SE) 23 of the storage device 2, and the security element 23 checks whether there is any digital wallet existed thereon. If not, the security element 23 creates the digital wallet 1.

The digital wallet creating request 40 has a strength determined according to a length or complexity of the password input by the user on the connected device 4. The longer or the more complex the password is, the stronger the digital wallet creating request 40 is. For example, a digital wallet creating request 40 generated by a password consisting of 12 characters is less strong than that generated by a password consisting of 18 or 24 characters.

Then, the processor 22 requests the security element 23 to generate and transmit a recovery mnemonic 24 to it. And, the generated recovery mnemonic 24 is shown to the user via the information conveying unit 20 of the storage device 2 for the user to record and back up it.

In an operable embodiment, the recovery mnemonic 24 can be formed of words, patterns, digits, sounds and the like, and the recovery mnemonic 24 can be recorded and backed up by manually writing it down, audio recording it, taking a picture of it, or just memorizing it. The information conveying unit 20 can also show the user the number of times or the number of sets the recovery mnemonic 24 is displayed, so that the user can correctly record and back up the complete recovery mnemonic 24. According to an operable embodiment, the information conveying unit 20 can be a display, a screen or a speaker capable of conveying or displaying the recovery mnemonic 24 to the user.

Then, the user informs the connected device 4 the backup of the recovery mnemonic 24 has completed. At this point, the connected device 4 can request the security element 23 to provide it with the information of the digital wallet 1, and the security element 23 in turn transmits the information of the digital wallet 1 to the connected device 4.

According to an operable embodiment, the user can operate on the operation interface 21 to input the recovery mnemonic 24 to the connected device 4, so that the connected device 4 receives a message from the user indicating the backup of the recovery mnemonic 24 has completed. In another operable embodiment, when the operation interface 21 receives an instruction input by the user indicating the recovery mnemonic 24 has been recorded, the storage device 2 confirms the backup of the recovery mnemonic 24 has completed.

Or, in an operable embodiment, the connected device 4 can request the security element 23 to provide it with an encoded asset message 10 after it has transmitted the recovery mnemonic 24 to the security element 23. On receipt of the recovery mnemonic 24 transmitted thereto by the connected device 4, the security element 23 verifies the received recovery mnemonic 24 is correct and then transmits the encoded asset message 10 to the connected device 4.

Or, in another operable embodiment, the user can touch to induce the operation interface 21 for the connected device 4 to receive a message indicating the backup of the recovery mnemonic 24 has completed. According to an operable embodiment, the touch induction of the operation interface 21 can be achieved via, for example, infrared or Bluetooth wireless technology, key pushing, touch control, specific pattern plotting, fingerprint or finger vein scanning, and specific sound or voice input.

According to a further operable embodiment, the touch induction of the operation interface 21 can be achieved by continuously and repeatedly touching the operation interface 21. Each time the operation interface 21 is induced by touching, the processor 22 will show one or a plurality of the recovery mnemonics 24 on the information conveying unit 20 for the user to receive and record. The user has to continuously repeat the movements of inducing and recording for the information conveying unit 20 to show all information of the recovery mnemonics 24.

In a preferred operable embodiment, the information conveying unit 20 can show the information of one or a plurality of the recovery mnemonics 24 only within a preset time period, and all the displayed information of the recovery mnemonics 24 will disappear and no longer show after the lapse of the preset time period.

In a further preferred operable embodiment, the information of the digital wallet 1 is encoded by the security element 23 to form the encoded asset message 10; and the encoded asset message 10 along with a user-input private key are then transmitted from the security element 23 to the connected device 4. On receipt of the encoded asset message 10 and the private key, the connected device 4 firstly verifies the user input private key is correct and then decodes the encoded asset message 10.

Finally, the connected device 4 creates and stores a piece of public digital wallet information 11 thereon.

According to the method of the present invention, the recovery mnemonic 24 is transmitted from the security element 23 to the information conveying unit 20 for displaying the recovery mnemonic 24 on the storage device 2, so that the user can record and back up the recovery mnemonic 24. That is, the recovery mnemonic 24 is not displayed via the connected device 4. In this case, even if the connected device 4 was stolen or lost, there is not any chance for a person who is not the owner of the connected device 4 and the digital wallet 1 to operate the stolen or the found connected device 4. And, in the event the storage device 2 was stolen or lost, the person who operates the stolen or lost storage device 2 can never have the chance to use the information of the digital wallet 1 on the storage device 2.

FIG. 3 is a flowchart showing the steps included in the first preferred embodiment of the method of the present invention for recovering the digital wallet 1. In the event the storage device 2 was lost, stolen or damaged, a substitute storage device 3 is required to replace the old storage device 2. The substitute storage device 3 can be a completely new substitute storage device 3 without any data stored thereon, or a substitute storage device 3 that had been used by another person and still has the person's data stored thereon. In the latter case, the substitute storage device 3 must be reset to clear all the old data before it can be used for subsequent recovery operation.

The substitute storage device 3 externally includes a substitute information conveying unit 30 and a substitute operation interface 31, and internally includes a substitute processor 32 and a substitute security element (SE) 33. The substitute information conveying unit 30, the substitute operation interface 31, the substitute processor 32 and the substitute security element 33 are electrically connected to one another. The following describes the steps for recovering the digital wallet 1 according to the first preferred embodiment of the method of the present invention with reference to FIG. 3.

First, the user instructs the connected device 4 to proceed with a movement for recovering the digital wallet 1 by inputting a recovering request 41. On receipt of the recovering request 41 from the user, the connected device 4 prompts the user to input a recovery mnemonic 24. The user then inputs the recovery mnemonic 24 on the connected device 4. It is noted the recovery mnemonic 24 is always the same in different embodiments of the present invention described herein.

According to the recovery mnemonic 24 input by the user, the connected device 4 generates a recovery seed key 60 for waking up the substitute security element 33.

Meanwhile, the user inputs a private key and the connected device 4 verifies the private key is correct before it starts encoding the recovery seed key 60 using an encoding algorithm. The recovery seed key 60 is turned into an encoded seed key 61 after the encoding.

Then, the connected device 4 transmits the recovery mnemonic 24 and the encoded seed key 61 to the substitute security element (SE) 33 at the same time. According to a preferred operable embodiment of the present invention, the substitute security element 33 internally has a default SE keypair pre-installed thereon, which is generated through asymmetric encryption.

The default SE keypair pre-installed on the substitute security element 33 can be used to decode the encoded seed key 61, so that the encoded seed key 61 is recovered to the recovery seed key 60. The default SE keypair pre-installed on the substitute security element 33 is also used to verify whether the recovery seed key 60 is correct.

After the recovery seed key 60 is verified to be correct, the substitute security element 33 transmits the information of the digital wallet 1 to the connected device 4, so that the connected device 4 has the information of the digital wallet 1 created thereon.

Figure 4:
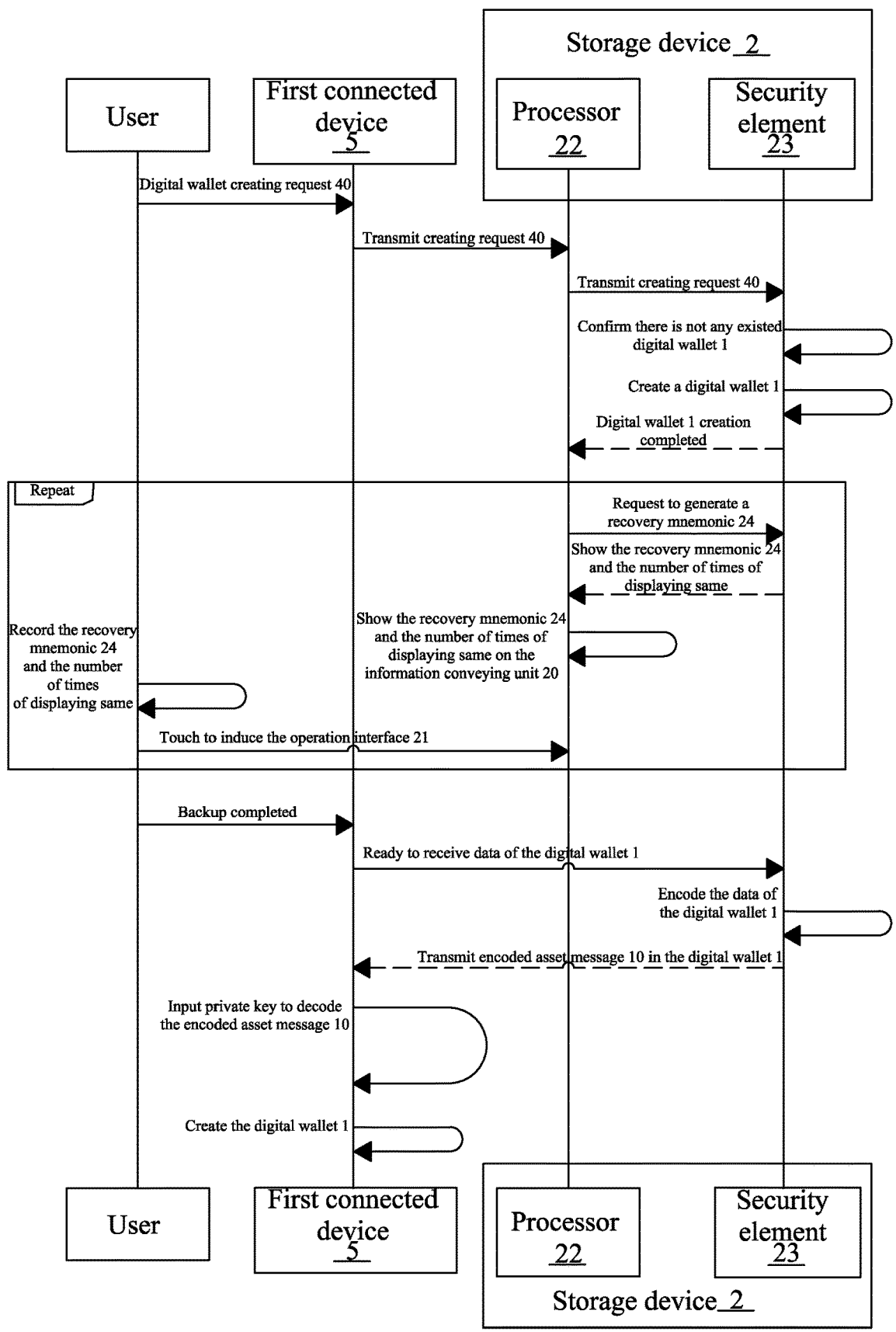
FIG. 4 is a flowchart showing the steps included in a second preferred embodiment of the method according to the present invention for creating a digital wallet.
Figure 5:
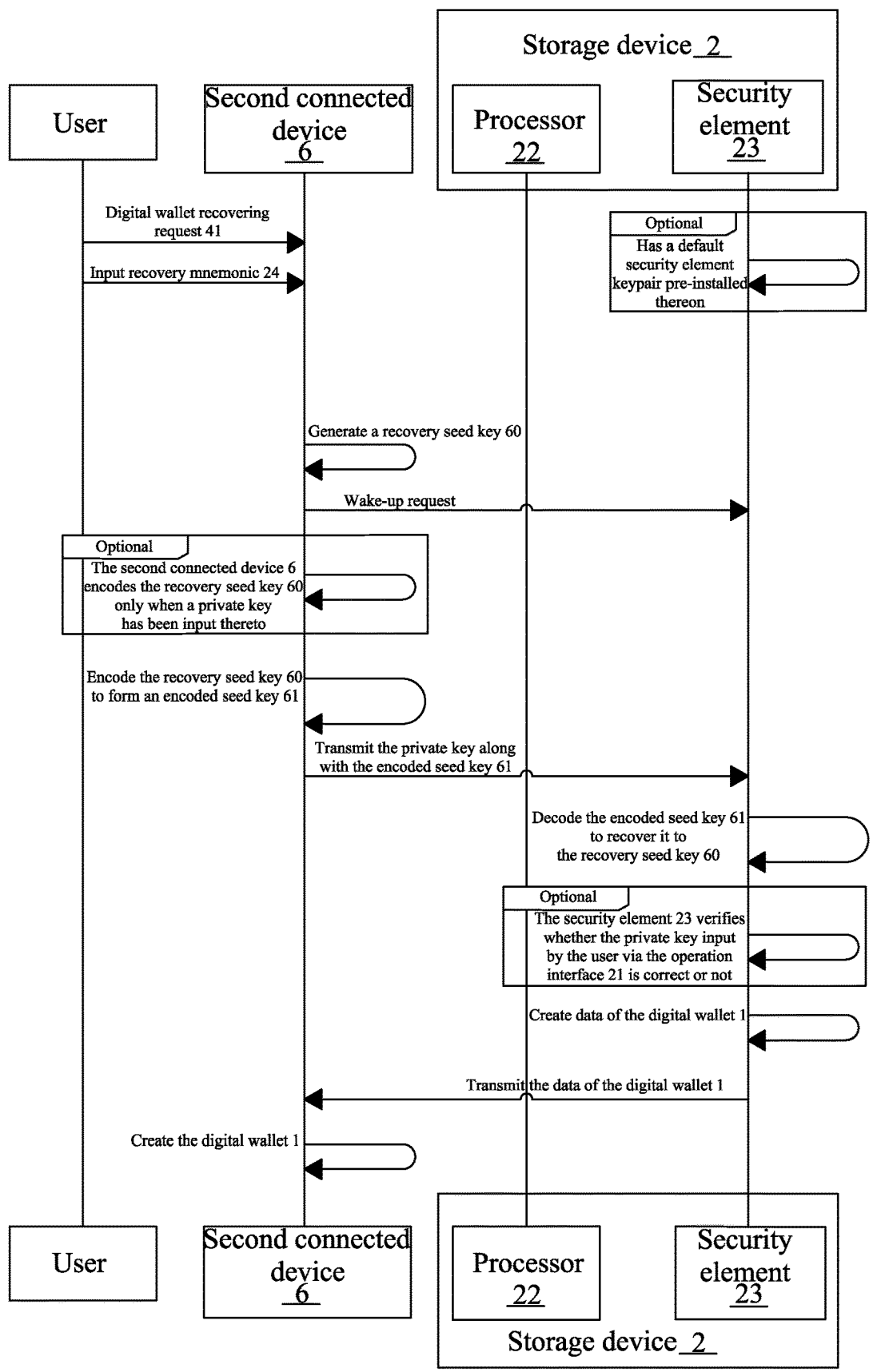
FIG. 5 is a flowchart showing the steps included in the second preferred embodiment of the method according to the present invention for recovering a digital wallet.

FIG. 4 is a flowchart showing the steps included in a second preferred embodiment of the digital wallet creating and recovering method of the present invention for creating a digital wallet 1; and FIG. 5 is a flowchart showing the steps included in the second preferred embodiment of the method of the present invention for use the digital wallet 1. Unlike the digital wallet recovering steps in the first preferred embodiment of the method of the present invention as shown in FIG. 3, which is designed to recover a digital wallet on the connected device 4 when the old storage device 2 was stolen, lost or damaged, the digital wallet recovering steps in the second preferred embodiment of the method of the present invention shown in FIG. 5 is designed to recover a digital wallet on a new connected device when an old connected device was stolen, lost or damaged.

In the second preferred embodiment of the digital wallet creating and recovering method shown in FIGS. 4 and 5, a connected device that is originally held by a user is defined as a first connected device 5, and a repurchased or another backup connected device for replacing the first connected device 5 is defined as a second connected device 6. Please refer to FIG. 4, which describes how a user creates a digital wallet 1 on the first connected device 5, and to FIG. 5, which describes how the user recovers the digital wallet on the second connected device 6.

Since the recovery mnemonic 24 is always the same in all embodiments of the digital wallet creating and recovering method of the present invention, the same recovery mnemonic 24 can be used for a different connected device, i.e. the second connected device 6 in the second preferred embodiment of the present invention, to generate the same recovery seed key 60.

Figure 6:
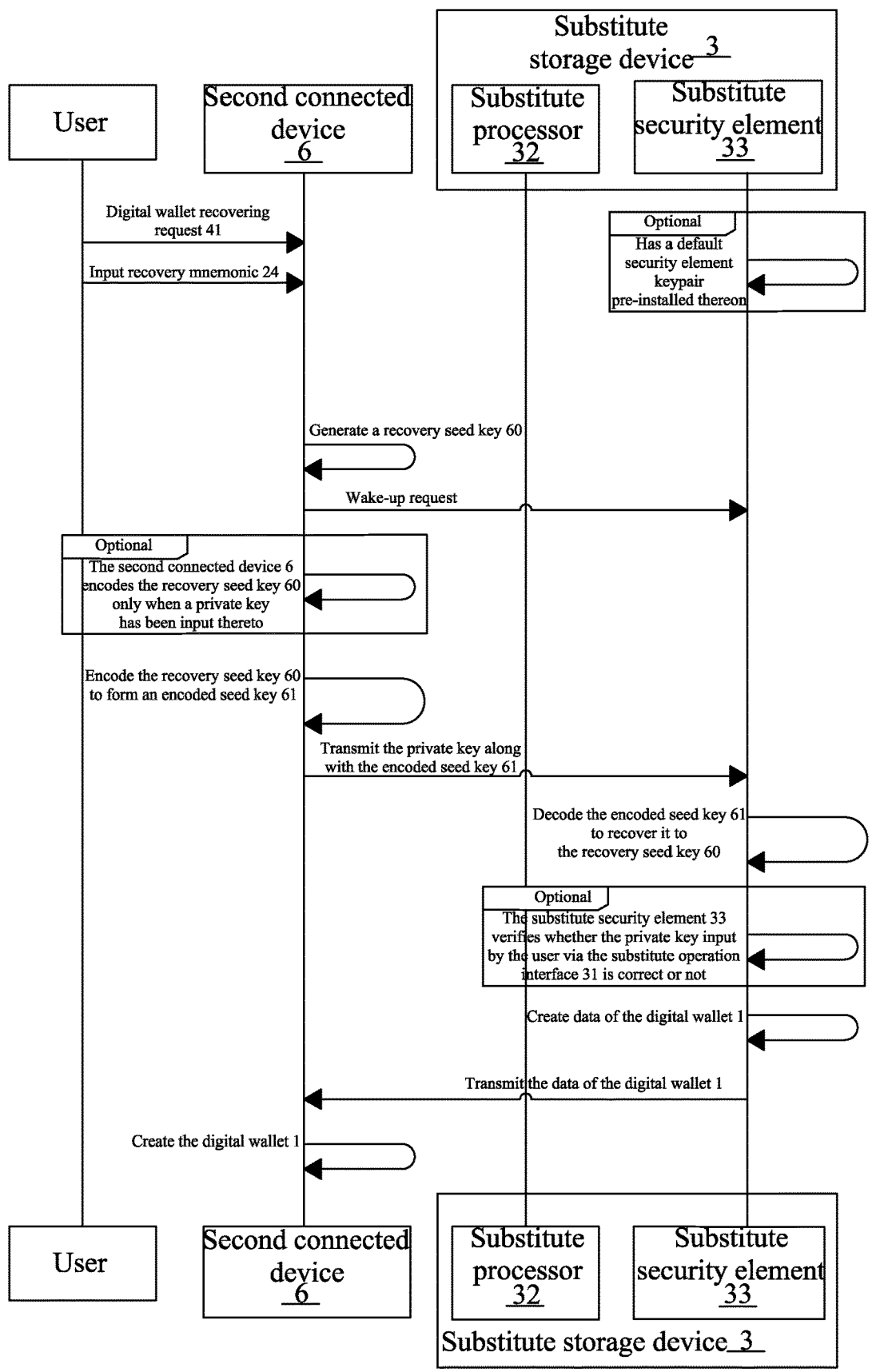
FIG. 6 is a flowchart showing the steps included in a third preferred embodiment of the method according to the present invention for recovering a digital wallet.

The second connected device 6 must be paired with the storage device 2 again and then connected to the latter, so that the second connected device 6 can transmit the recovery mnemonic 24 and the encoded seed key 61 to the security element 23 at the same time, as shown in FIG. 5. Alternatively, in a third preferred embodiment of the method according to the present invention, the digital wallet recovering steps thereof, as shown in FIG. 6, are designed to recover the digital wallet 1 on the second connected device 6 when the old storage device 2 was also stolen, lost or damaged and replaced by a substitute storage device 3. According to the third preferred embodiment of the method of the present invention, after the second connected device 6 has been paired with and connected to the substitute storage device 3, the second connected device 6 transmits the recovery mnemonic 24 and the encoded seed key 61 to the substitute security element 33 at the same time.

In the case the substitute storage device 3 had been used by another person and still has the person's data stored thereon, the substitute storage device 3 must firstly be reset to clear all the old data before the second connected device 6 can be paired with and connected to the substitute storage device 3.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A method of creating and recovering digital wallet, being implemented via a closed storage device and a connected device that are connected to each other, the storage device having a private key stored thereon for use to transact a digital asset, and the storage device including an information conveying unit, an operation interface, a processor and a security element; the method comprising the following steps:

a user using the connected device to generate and transmit a digital wallet creating request to the security element via the processor of the storage device;

the security element, on receipt of the creating request, checking whether there is any digital wallet existed thereon; and the security element creating a digital wallet when it verifies there is not any digital wallet existed thereon;

the processor requesting the security element to generate and transmit a recovery mnemonic to it and then showing the recovery mnemonic to the user via the information conveying unit of the storage device, and the user recording and backing up the recovery mnemonic;

the connected device receiving from the security element an encoded asset message that is stored in the digital wallet and then decoding the encoded asset message to create a piece of public digital wallet information thereon;

the connected device obtaining the recovery mnemonic according to a digital wallet recovering request, and the connected device further generating a recovery seed key according to the recovery mnemonic;

the connected device encoding the recovery seed key to form an encoded seed key and transmitting the encoded seed key to a substitute security element on a substitute storage device, and then the substitute security element decoding the encoded seed key to recover the encoded seed key to the recovery seed key; and the substitute security element transmitting the information of the digital wallet to the connected device, so that the connected device has updated public digital wallet information created thereon.

2. The method of creating and recovering digital wallet as claimed in claim 1, wherein the information conveying unit shows the recovery mnemonic to the user by displaying the recovery mnemonic on a surface of the storage device and the user receives, records and backs up the recovery mnemonic by sensory perception, including touching, listening to or viewing the storage device.

3. The method of creating and recovering digital wallet as claimed in claim 2, further comprising the following steps: after recording the recovery mnemonic, the user inputting on the operation interface an instruction indicating the recovery mnemonic has been recorded, and the storage device verifying the backup of the recovery mnemonic has completed by the user.

4. The method of creating and recovering digital wallet as claimed in claim 1, wherein the digital wallet recovering request is input by the user by operating on the connected device when the storage device was stolen, lost or damaged; and the connected device, on receipt of the digital wallet recovering request, prompts the user to input the recovery mnemonic on the connected device.

5. The method of creating and recovering digital wallet as claimed in claim 1, wherein the connected device also generates a private key when it generates the recovery seed key, and the private key is transmitted along with the encoded seed key to the substitute security element of the substitute storage device; and wherein the substitute security element verifies the private key and the recovery seed key are correct after the encoded seed key has been recovered to the recovery seed key.

6. A method of creating and recovering digital wallet, being implemented via a closed storage device and a first connected device that are connected to each other, the storage device having a private key stored thereon for use to transact a digital asset, and the storage device including an information conveying unit, an operation interface, a processor and a security element; the method comprising the following steps:

a user using the first connected device to generate and transmit a digital wallet creating request to the security element via the processor of the storage device;

the security element, on receipt of the creating request, checking whether there is any digital wallet existed thereon; and the security element creating a digital wallet when it verifies there is not any digital wallet existed thereon;

the processor requesting the security element to generate and transmit a recovery mnemonic to it and then showing the recovery mnemonic to the user via the information conveying unit of the storage device, and the user recording and backing up the recovery mnemonic;

the first connected device receiving from the security element an encoded asset message that is stored in the digital wallet and then decoding the encoded asset message to create a piece of public digital wallet information thereon;

a second connected device obtaining the recovery mnemonic according to a digital wallet recovering request, and the second connected device further generating a recovery seed key according to the recovery mnemonic;

the second connected device encoding the recovery seed key to form an encoded seed key and transmitting the encoded seed key to the security element of the storage device or a substitute security element on a substitute storage device, and then the security element or the substitute security element decoding the encoded seed key to recover the encoded seed key to the recovery seed key; and the security element or the substitute security element creating the digital wallet according to the recovery seed key and transmitting information of the digital wallet to the second connected device, so that the second connected device has public digital wallet information created thereon.

7. The method of creating and recovering digital wallet as claimed in claim 6, wherein the information conveying unit shows the recovery mnemonic to the user by displaying the recovery mnemonic on a surface of the storage device, and the user receives, records and backs up the recovery mnemonic by sensory perception, including touching, listening to or viewing the storage device.

8. The method of creating and recovering digital wallet as claimed in claim 7, further comprising the following steps: after recording the recovery mnemonic, the user inputting on the operation interface an instruction indicating the recovery mnemonic has been recorded, and the storage device verifying the backup of the recovery mnemonic has completed by the user.

9. The method of creating and recovering digital wallet as claimed in claim 6, wherein the digital wallet recovering request is input by the user by operating on the second connected device when the first connected device and/or the storage device was stolen, lost or damaged; and the second connected device, on receipt of the digital wallet recovering request, prompts the user to input the recovery mnemonic on the second connected device.

10. The method of creating and recovering digital wallet as claimed in claim 6, wherein the second connected device also generates a private key when it generates the recovery seed key, and the private key is transmitted along with the encoded seed key to the security element of the storage device or the substitute security element of the substitute storage device; and wherein the security element or the substitute security element verifies the private key and the recovery seed key are correct after the encoded seed key has been recovered to the recovery seed key.

* * * * *